(12) United States Patent
Brown (10) Patent No.: US 11,952,799 B2
(45) Date of Patent: *Apr. 9, 2024

(54) WIRELESS LOCKSET WITH INTEGRATED ANGLE OF ARRIVAL (AoA) DETECTION

(71) Applicant: ASSA ABLOY Americas Residential Inc., New Haven, CT (US)

(72) Inventor: Troy M. Brown, Aliso Viejo, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/858,696

(22) Filed: Jul. 6, 2022

(65) Prior Publication Data

US 2023/0034014 A1 Feb. 2, 2023

Related U.S. Application Data

(63) Continuation of application No. 16/093,489, filed as application No. PCT/US2017/027109 on Apr. 12, 2017, now Pat. No. 11,401,733.

(Continued)

(51) Int. Cl.
*E05B 47/00* (2006.01)
*G01S 19/42* (2010.01)
(Continued)

(52) U.S. Cl.
CPC ...... *E05B 47/0001* (2013.01); *G07C 9/00182* (2013.01); *H04B 1/02* (2013.01);
(Continued)

(58) Field of Classification Search
CPC ......... E05B 47/0001; E05B 2047/0067; H04B 1/06; H04B 1/02; G07C 9/00182;
(Continued)

(56) References Cited

U.S. PATENT DOCUMENTS 7,446,644 B2 * 11/2008 Schaffzin ........... G07C 9/00182
340/686.2
8,126,450 B2 2/2012 Howarter et al.
(Continued)

FOREIGN PATENT DOCUMENTS

CN 104221413 A 12/2014
CN 105278677 A 1/2016
(Continued)

OTHER PUBLICATIONS

International Search Report and Written Opinion for PCT/US2017/027109 (dated Jul. 7, 2017).
(Continued)

*Primary Examiner* — Nam V Nguyen
(74) *Attorney, Agent, or Firm* — Merchant & Gould, P.C.

(57) ABSTRACT

A lockset with a latch assembly having a bolt movable between an extended position and a retracted position. The lockset includes a motor configured to move the bolt between the extended position and the retracted position. A controller is provided that is configured to electronically control the motor to control movement of the bolt between the extended position and the retracted position responsive to receiving a valid authentication from an authentication device. The lockset includes a receiver connected to an antenna to detect an incoming wireless signal transmitted from an authentication device. The controller includes an angle of arrival sensor configured to determine a distance and a direction to the authentication device by analyzing a wireless phase and timing of the incoming wireless signal transmitted by the authentication device. The controller is configured to control movement of the bolt between the extended and retracted positions based, at least in part, on the distance and the direction to the authentication device.

22 Claims, 4 Drawing Sheets

Related U.S. Application Data (60) Provisional application No. 62/322,885, filed on Apr. 15, 2016.

(51) Int. Cl.
    *G07C 9/00*     (2020.01)
    *H04B 1/02*     (2006.01)
    *H04B 1/06*     (2006.01)
    *H04W 12/63*     (2021.01)

(52) U.S. Cl.
CPC .............. *H04B 1/06* (2013.01); *H04W 12/63* (2021.01); *E05B 2047/0067* (2013.01); *E05Y 2201/434* (2013.01); *E05Y 2400/66* (2013.01); *E05Y 2400/85* (2013.01); *E05Y 2900/132* (2013.01); *G01S 19/42* (2013.01)

(58) Field of Classification Search
CPC .. H04W 12/63; G01S 19/42; E05Y 2201/434; E05Y 2900/132; E05Y 2400/66; E05Y 2400/85; H04M 3/00
USPC ............. 340/5.72, 10.1–10.5; 70/278, 278.1; 455/420, 410
See application file for complete search history.

(56) References Cited

U.S. PATENT DOCUMENTS

| | | | |
|---|---|---|---|
| 8,490,443 B2 | 7/2013 | Gokcebay | |
| 8,760,631 B2 | 6/2014 | Ritter et al. | |
| 9,007,173 B2 | 4/2015 | McIntyre et al. | |
| 9,050,943 B2* | 6/2015 | Muller | G07C 9/00309 |
| 9,195,305 B2 | 11/2015 | Markovic et al. | |
| 9,196,104 B2 | 11/2015 | Dumas et al. | |
| 9,218,696 B2 | 12/2015 | Dumas et al. | |
| 9,485,627 B2 | 11/2016 | David et al. | |
| 9,512,643 B1 | 12/2016 | Keefe | |
| 9,640,004 B2* | 5/2017 | Lowder | G07C 9/00309 |
| 9,680,840 B2* | 6/2017 | Choi | G09G 5/12 |
| 9,706,514 B2 | 7/2017 | Silverman et al. | |
| 9,713,002 B2* | 7/2017 | Roy | H04W 4/025 |
| 9,721,408 B2* | 8/2017 | Obata | E05F 15/76 |
| 9,769,165 B2* | 9/2017 | Varshavsky | H04L 63/0861 |
| 9,886,805 B1 | 2/2018 | Bianchi, III et al. | |
| 9,940,766 B2 | 4/2018 | Toivonen et al. | |
| 9,959,506 B1 | 5/2018 | Karppanen | |
| 10,147,252 B2* | 12/2018 | Schindler | H04L 12/40 |
| 10,228,444 B2 | 3/2019 | Jonsson | |
| 10,748,360 B2 | 8/2020 | Telljohann et al. | |
| 10,839,627 B2 | 11/2020 | Golsch et al. | |
| 11,401,733 B2* | 8/2022 | Brown | H04B 1/02 |
| 2008/0196458 A1 | 8/2008 | Lu | |
| 2008/0224836 A1* | 9/2008 | Pickering | B60R 25/2045 340/426.14 |
| 2010/0075656 A1 | 3/2010 | Howarter et al. | |
| 2011/0316667 A1 | 12/2011 | Tran | |
| 2014/0157842 A1 | 6/2014 | Almomani et al. | |
| 2014/0184499 A1 | 7/2014 | Kim | |
| 2014/0225713 A1 | 8/2014 | McIntyre et al. | |
| 2014/0292481 A1 | 10/2014 | Dumas et al. | |
| 2014/0327579 A1 | 11/2014 | Hart et al. | |
| 2015/0189619 A1 | 7/2015 | Kalliola et al. | |
| 2015/0234033 A1 | 8/2015 | Jamieson et al. | |
| 2015/0362997 A1 | 12/2015 | Hatton | |
| 2016/0050308 A1* | 2/2016 | Liu | H04W 4/00 455/411 |
| 2016/0088438 A1 | 3/2016 | O'Keeffe | |
| 2018/0052217 A1 | 2/2018 | Jonsson | |

FOREIGN PATENT DOCUMENTS

| | | |
|---|---|---|
| JP | 2000-147099 A | 5/2000 |
| WO | 2014/210556 A1 | 12/2014 |
| WO | 2015/010734 A1 | 1/2015 |
| WO | 2015/064020 A1 | 5/2015 |

OTHER PUBLICATIONS

Anonymous, "Indoor positioning system—Wikipedia" (2015).
Search Report for European Patent Application No. 17783022.1 (dated Oct. 24, 2019).

* cited by examiner

WIRELESS LOCKSET WITH INTEGRATED ANGLE OF ARRIVAL (AoA) DETECTION

RELATED APPLICATIONS

This application is a Continuation of U.S. patent application Ser. No. 16/093,489, filed Oct. 12, 2018, now U.S. Pat. No. 11,401,733, which is a US National Stage Application of PCT/US2017/027109, filed Apr. 12, 2017, which claims the benefit of U.S. Provisional Application Ser. No. 62/322,885, filed Apr. 15, 2016, which applications are incorporated herein by reference. To the extent appropriate, a claim of priority is made to each of the above disclosed applications.

TECHNICAL FIELD

The present disclosure relates generally to locksets. In particular, the present disclosure relates to a lockset that wirelessly detects an authentication device.

BACKGROUND AND SUMMARY

Some electronic locksets can be authenticated wirelessly, such as with a key fob or mobile device. The position of the authentication device (e.g., key fob, mobile device, etc.) relative to the lockset can have important implications for security. For example, it can be important for the lockset to determine whether the authentication device is inside or outside the door. If the lockset cannot differentiate whether the authentication device is inside or outside the door, an intruder might be able to actuate the lockset by luring a homeowner with an authentication device near the inside of the door.

Some electronic locksets attempt to determine the position of the authentication device using the received wireless signal strengths (RSSI) of the devices. In particular, the lockset will utilize multiple antennas in conjunction with a microprocessor to determine the location of the authentication device based on the RSSI with a special algorithm. For example, there could be a comparison of wireless signal strengths of multiple antennas to calculate a rough location of the wireless fob or mobile device. However, the use of RSSI to determine the authentication device's position results in a complex design with increased cost. Accordingly, there exists a need for a less complex manner of locating the position of an authentication device.

According to one aspect, this invention provides a lockset with a latch assembly having a bolt movable between an extended position and a retracted position. The lockset includes a motor configured to move the bolt between the extended position and the retracted position. A controller is provided that is configured to electronically control the motor to control movement of the bolt between the extended position and the retracted position responsive to receiving a valid authentication from an authentication device. The lockset includes a receiver connected to an antenna to detect an incoming wireless signal transmitted from an authentication device. The controller includes an angle of arrival sensor configured to determine a distance and a direction to the authentication device by analyzing a wireless phase and timing of the incoming wireless signal transmitted by the authentication device. The controller is configured to control movement of the bolt between the extended and retracted positions based, at least in part, on the distance and the direction to the authentication device. By using an angle of arrival sensor, in at least in some embodiments, the number of antennas needed to detect the position of the authentication device is reduced. In particular, in some embodiments, the angle of arrival sensor will incorporate in an antenna array on either the interior side of the lockset or the exterior side of the lockset, but not need an antenna or antenna array on both the interior and exterior, which is commonly needed in existing locksets to determine whether a position of the authentication device is inside or outside the door. Accordingly, in embodiments incorporating the angle of arrival sensor, the expensive and delicate cable wiring to an antenna switch on existing locksets with antennas on both the interior and exterior is unnecessary.

According to another aspect, this invention provides a method of detecting an authentication device for use with an electronic lockset. The method includes the step of providing an electronic lockset with a controller configured to control movement of a bolt between a locked position and an unlocked position. The controller monitors for an incoming wireless signal emitted from an authentication device. The incoming wireless signal is detected with a receiver and an antenna. The controller analyzes wireless phase and timing information from the incoming wireless signal and determines distance and direction to the authentication device through the analysis of the wireless phase and timing information. The movement of the bolt is controlled between the locked and the unlocked position based on the distance and direction to the authentication device.

BRIEF DESCRIPTION OF THE DRAWINGS

The detailed description makes reference to the accompanying figures in which.

DETAILED DESCRIPTION OF THE DRAWINGS

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

This disclosure generally relates to an electromechanical lock with certain features. The term "electromechanical lock" or "lock" or "lockset" is broadly intended to include any type of lockset that uses electrical power in some manner, such as for controlled access, but also has a mechanical portion that can be actuated with a mechanical key, including but not limited to electronic deadbolts, electronic lever sets, etc. This disclosure encompasses the integration of one or more features described herein into any type of electromechanical lock and is not intended to be limited to any particular type of electromechanical lock. An example of such a lockset includes U.S. Pat. No. 9,024,759 entitled "Wireless Lockset with Integrated Antenna, Touch Activation, and Light Communication Method," which is hereby incorporated by reference.

Figure 1:
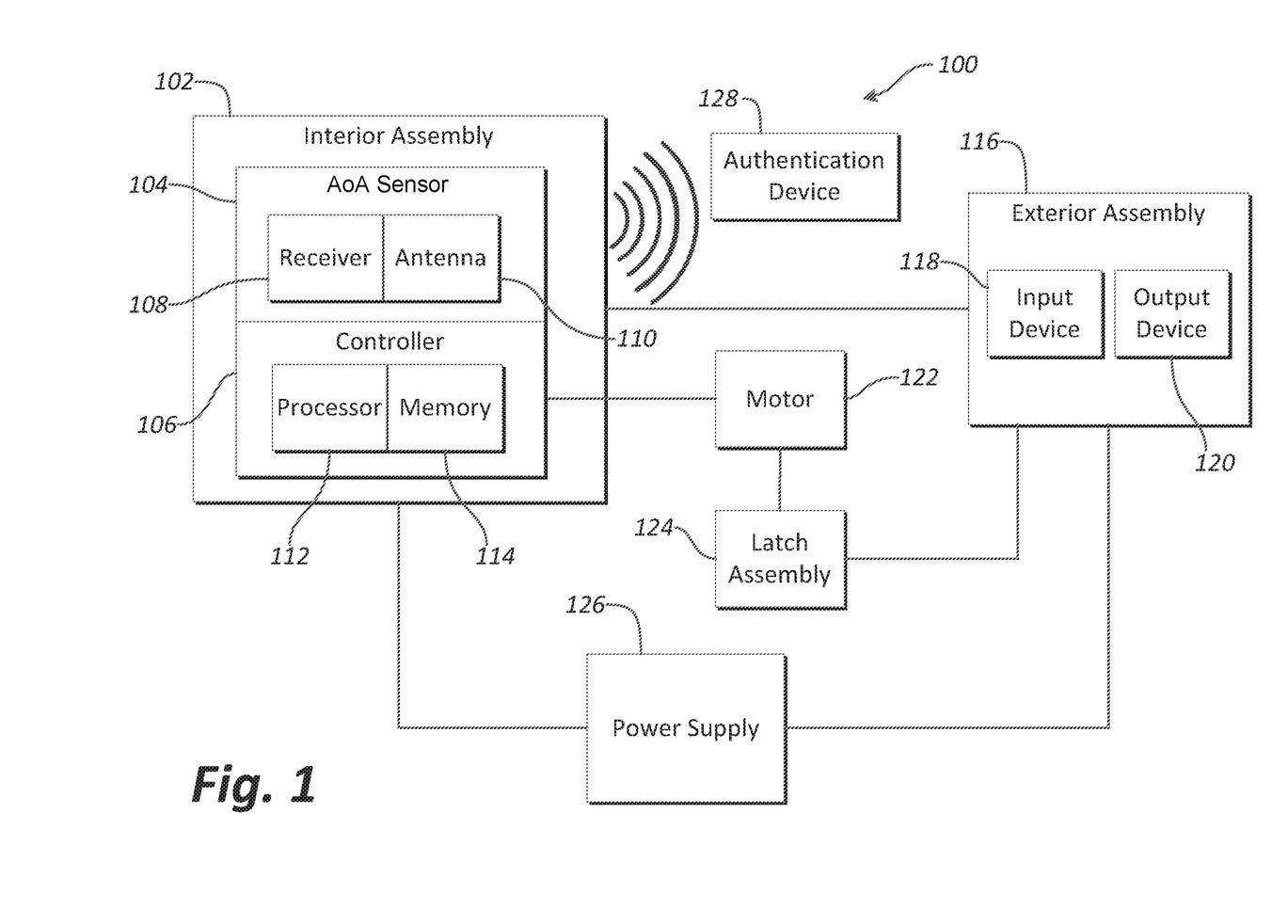
FIG. 1 is a simplified block diagram of an example lockset system for electronically controlling a motor to move a deadbolt between an unlocked and locked position according to an embodiment of the disclosure.

FIG. 1 shows an example lockset system 100 according to an embodiment of the disclosure. In the example shown, the lockset system 100 includes an interior assembly 102, an exterior assembly 116, a motor 122, a latch assembly 124, and a power supply 126. Typically, the interior assembly 102 is mounted on the inside of a door, while the exterior assembly 116 is mounted on the outside of a door. The motor 122 is shown to be separate from the interior assembly 102. In another embodiment, the motor 122 may be inside the interior assembly 102. The latch assembly 124 is typically mounted in a bore formed in the door and is connected to the motor 122. The latch assembly 124 may include a bolt movable between an extended position and a retracted position. Typically, the extended position is a locked position and the retracted position is an unlocked position. The term "inside" is broadly used to denote an area inside a door and "outside" is also broadly used to mean an area outside a door. For example, with an exterior entry door, the interior assembly 102 may be mounted inside a building and the exterior assembly 116 may be mounted outside a building. In another example, with an interior door, the interior assembly 102 may be mounted inside a room secured by the lockset system 100 located inside a building, and the exterior assembly 116 may be mounted outside the secured room. The lockset system 100 is applicable to both interior and exterior doors. The lockset system 100 may also be used in such a way to secure any room with the interior assembly 102 located on the inside of the room and the exterior assembly 112 located on the outside of the room.

In the embodiment shown, the interior assembly 102 includes an angle of arrival (AoA) sensor 104 to detect signals from an authentication device 128 and a controller 106 to analyze the signals received from the AoA sensor 104. The AoA sensor 104 is configured to analyze the wireless phase angle information of an incoming wireless signal, in addition to the timing between packets of the incoming signal to determine a direction and distance from the lockset to the authentication device 128. By way of example, the authentication device 128 may be embodied as a key fob, a smartphone, a wireless communication device, etc. The interior assembly 102 may detect the location of the authentication device 128 using the AoA sensor 104 through Bluetooth™, Wi-Fi, or other protocol. The AoA sensor 104 includes a receiver 108 and an antenna 110 to detect incoming wireless signals from the authentication device 128. The controller 106 includes a processor 106 to process instructions stored on a memory 114. The AoA sensor 104 is electrically connected to the controller 106 in order to send the detected wireless signals to the controller 106 for analysis. In some embodiments, the AoA sensor 104 could be integrated into the controller 106. In some embodiments, the controller 106 analyzes the wireless phase and timing information from the incoming wireless signal to determine the distance and direction of the authentication device 128 that is transmitting the wireless signal relative to the lockset system 100. The distance and direction information is further analyzed by the lockset system 100 to identify the location of the authentication device 128. The controller 106 is electronically connected to the motor 122 to selectively control movement of the motor 122. The interior assembly 102 is powered by the power supply 126. The power supply 126 may be embodied as batteries, a wall outlet, a solar panel, etc. The power supply 126 may also include other components (not shown) to convert the power to a usable form for the interior assembly 102. The interior assembly 102 is in electrical communication with the exterior assembly 116. The lockset system 100 may have components that, if not in use, will be put into a sleep state to conserve power.

In the embodiment shown, the exterior assembly 116 includes an optional input device 118 and an output device 120. The input device 118 may be a keypad, a touch surface, or any other device to receive an input, such as to receive an authentication device 128 for authentication. The exterior assembly 116 is connected to the latch assembly 124 to manually actuate the bolt between the extended position and the retracted position. The exterior assembly is powered by the power supply 126. In the embodiment shown, the power supply 126 is connected to both the interior assembly 102 and the exterior assembly 116. In another embodiment, there may be another power supply (not shown) that provides power to the exterior assembly 116 separately from power supply 126.

In one embodiment, the interior assembly 102 may actuate the motor 122 through the controller 106 to move the bolt of the latch assembly 124 between the extended and the retracted positions. The interior assembly 102 may receive signals from the exterior assembly 116 to actuate the motor 122 between the extended and the retracted positions. The input device 118 may be used to receive an authentication code to send to the interior assembly 102. The interior assembly 102 may receive the input and verify the input matches the authentication code to actuate the motor 122 to move the bolt between the extended and retracted positions.

In the embodiment shown, the AoA sensor 104 is located in the interior assembly 102. In another embodiment, the AoA sensor 104 may be located in the exterior assembly 116. One technical advantage of using the AoA sensor 104 is that an antenna array connected to the AoA sensor needs to only be located on either the interior assembly 102 or the exterior assembly 116, but not both. This distinguishes existing electronic locks in which antennas and/or antenna arrays are located on both the interior and exterior assemblies to determine approximate location and distance between the lock and the authentication device 128. One downside with such an existing arrangement, in addition to needing multiple antenna arrays, is the need for cable wiring to an antenna switch due to having antennas on the interior and exterior assemblies physically separated by the door. The AoA sensor 104 may detect an incoming wireless signal and send the information to the controller 106 as described above. The controller 106 may analyze the distance and direction information determined from the analysis of the wireless phase and timing information received from the AoA sensor 104 to identify the location of the authentication device 128 as described above. The following documents describe the use of a AoA sensor to determine the position from which a wireless signal emanates: WO 2014/210556 entitled "Location Service for Enhancement of Smart Device;" U.S. Pat. No. 8,760,631 entitled "Distance Sensing By IQ Domain Differentiation of Time of Flight (AOA) Measurements;" U.S. Pat. No. 9,195,305 entitled "Recognizing User Intent in Motion Capture System;" and U.S. Pub. No. 2014/0184499 entitled "Remote Manipulation Device and Method Using a Virtual Touch of a Three-Dimensionally Modeled Electronic Device," which are all incorporated by reference.

In an illustrative embodiment, the received or analyzed information can be used for at least one of a wakeup, authentication, notification purposes, etc. Various pieces of information may be used for different purposes. For example, the incoming wireless signal may be used for the wakeup of the lockset system 100 or components that are in a sleep state.

In one embodiment, the information can also be analyzed for authentication, such as by using an algorithm to detect patterns in the information and store the patterns in memory 114 for later use as an authentication factor. For example, the authentication device 128 may be waved around by the user in a pattern such as a plus sign, triangle (or other geometric pattern) to authenticate the authentication device 128. In one embodiment, only the pattern authentication could be needed to unlock the lockset system 100. In another embodiment, the pattern authentication may be used in conjunction with another authentication method, such as with the input device 118 of the exterior assembly 116. The pattern authentication may also be used to lock the lockset system 100. In another embodiment, the pattern authentication may be used in conjunction with another input device to lock the lockset system 100. The pattern may be associated with the particular authentication device 128. In another embodiment, the pattern may be a general authentication pattern that may be performed by any authentication device 128. In another embodiment, the authentication pattern could be associated with one or more messages to be sent by the lockset system 100 to other devices on a home automation network. For example, a certain authentication pattern could be defined to both unlock the lockset system 100 and send a message to a lighting system on a network to turn on certain lights in the building. By way of another example, another authentication pattern could be defined to both lock the lockset and send a message to a thermostat on a network to go into away mode.

The controller 106 may be able to analyze the information coming from the AoA sensor 104 to detect an attempt to replicate a stored pattern in memory 114. The controller 106 may send a signal to the output device 120 in order to broadcast an alert of a failed attempt at replicating a stored pattern in memory 114. The controller 106 may send a push notification of the failed attempt or a successful attempt to the authentication device 128.

In one embodiment, upon unlocking the lockset system 100 through a valid authentication, the lockset system 100 may send notifications to the authentication device 128 or other predefined distribution list announcing the lockset system 100 is unlocked after proper authentication. The notifications may also be automatically sent to social media sites to advertise arrival to the location at which the lockset system 100 is located. The notifications may also be sent automatically in response to locking the lockset system 100. The lockset system 100 may send notifications to the authentication device 128 announcing the lockset system 100 is locked. These notifications may be to advertise to social media sites that you are on your way out of the location. The notifications may provide other information to social media sites or authentication device 128.

In one embodiment, the lockset system 100 may use the distance and direction information in order to initiate an authentication process and unlock the lockset system 100. The distance and direction information may also be used to lock the lockset system 100. For example, if an authentication device 128 is detected through the AoA sensor 104 to approach the lockset system 100, then the lockset system 100 may unlock the door for a valid authentication device 128. In addition, in another example, the authentication device 128 may be detected through the AoA sensor 104 to be getting farther from the lockset system 100, and then the lockset system 100 may lock the door for the valid authentication device 128. In one embodiment, the lockset system 100 may detect the approach of an invalid authentication device 128 in absence of a valid authentication device 128 and lock the door upon determining that the invalid authentication device is approaching the door. In one embodiment, the distance in which the lockset system 100 locks and unlocks the door may be calibrated for any situation. For example, in a case where the lockset system 100 is installed on a door within an apartment, the distance for interacting with the lockset system 100 may be small to improve security. In another example, for a lockset system 100 installed on a door of a residential home, the distance for interacting with the lockset system 100 may be larger to allow for more flexibility. In another embodiment, the lockset system 100 may use the distance and direction information in conjunction with an input device 118 to initiate an authentication and unlock the lockset system 100.

In one embodiment, the lockset system 100 may have a timer to lock the lockset system 100 if the lockset system 100 is not engaged within a predetermined amount of time. For example, if the authentication device 128 is approaching the lockset system 100, the door will be unlocked. However, if the lockset system 100 has detected that the authentication device 128 has stopped approaching the lockset system 100, after a predetermined amount of time, the lockset system 100 will lock to prevent entry of an intruder. In one embodiment, the lockset system 100 may utilize the AoA sensor 104 in addition to GPS data of the authentication device 128 to receive a more accurate location of the authentication device in relation to the lockset system 100.

Figure 2:
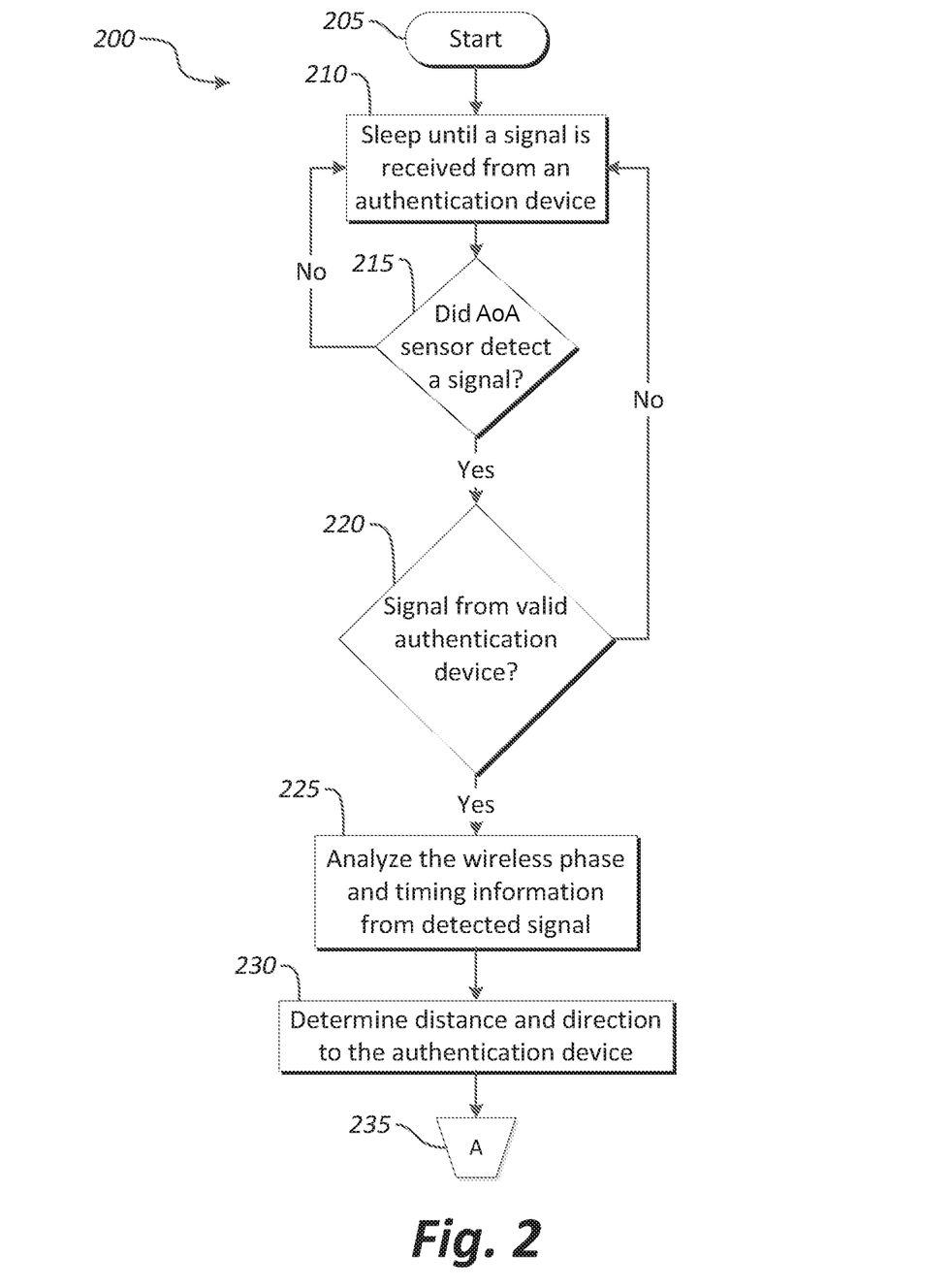
FIG. 2 is a simplified flowchart showing an example operation of the example lockset system interacting with an authentication device utilizing an angle of arrival sensor according to an embodiment of the disclosure.

FIG. 2 is a simplified flow chart showing an example operation of the lockset system 100 using the AoA sensor 104. In the example shown, a method of operation 200 begins with operation 205 where a process starts. After operation 205, the process continues to operation 210 where the lockset system 100 is in a sleep state until a signal is received from an authentication device as described above. In one embodiment, several components of the lockset system 100 may be in a sleep state. In another embodiment, only the components of the lockset system 100 that are used in the detection of an incoming wireless signal are active. After operation 210, the process continues to operation 215 where the AoA sensor 104 will check if the signal is detected. In one embodiment, the AoA sensor 104 periodically checks to see if the signal is detected. In another embodiment, the AoA sensor 104 will continuously check for the signal. If a signal is not detected, then the process returns to operation 210. If a signal is detected, then the process continues to operation 220 where the lockset system 100 determines if the signal is from a valid authentication device 128.

If the signal is not from a valid authentication device 128, then the process returns to operation 210. If the signal is from a valid authentication device 128, then the process continues to operation 225. In one embodiment, the lockset system 100 may verify that the authentication device 128 is a valid authentication device 128 through a list of valid authentication devices 128 stored in memory. The list of valid authentication devices 128 may be generated through pairing the lockset system 100 with an authentication device 128. In another embodiment, the list of valid authentication device 128 may be generated through any secure method of connecting the lockset system 100 with an authentication device 128. In another embodiment, the method of operation 200 may receive signals from any authentication devices 128 in order to detect general patterns stored in memory performed by any authentication device 128. In operation 225, the lockset system 100 analyzes a wireless phase and timing information from the detected signal. After operation 225, the process continues to operation 230 where the lockset system 100 determines a distance and direction to the authentication device 128 that emitted the detected signal. The lockset system 100 may store the distance and direction information in memory 114. After operation 230, the process continues to operation 235 where the method of operation 200 continues from FIG. 2 to FIG. 3.

Figure 3:
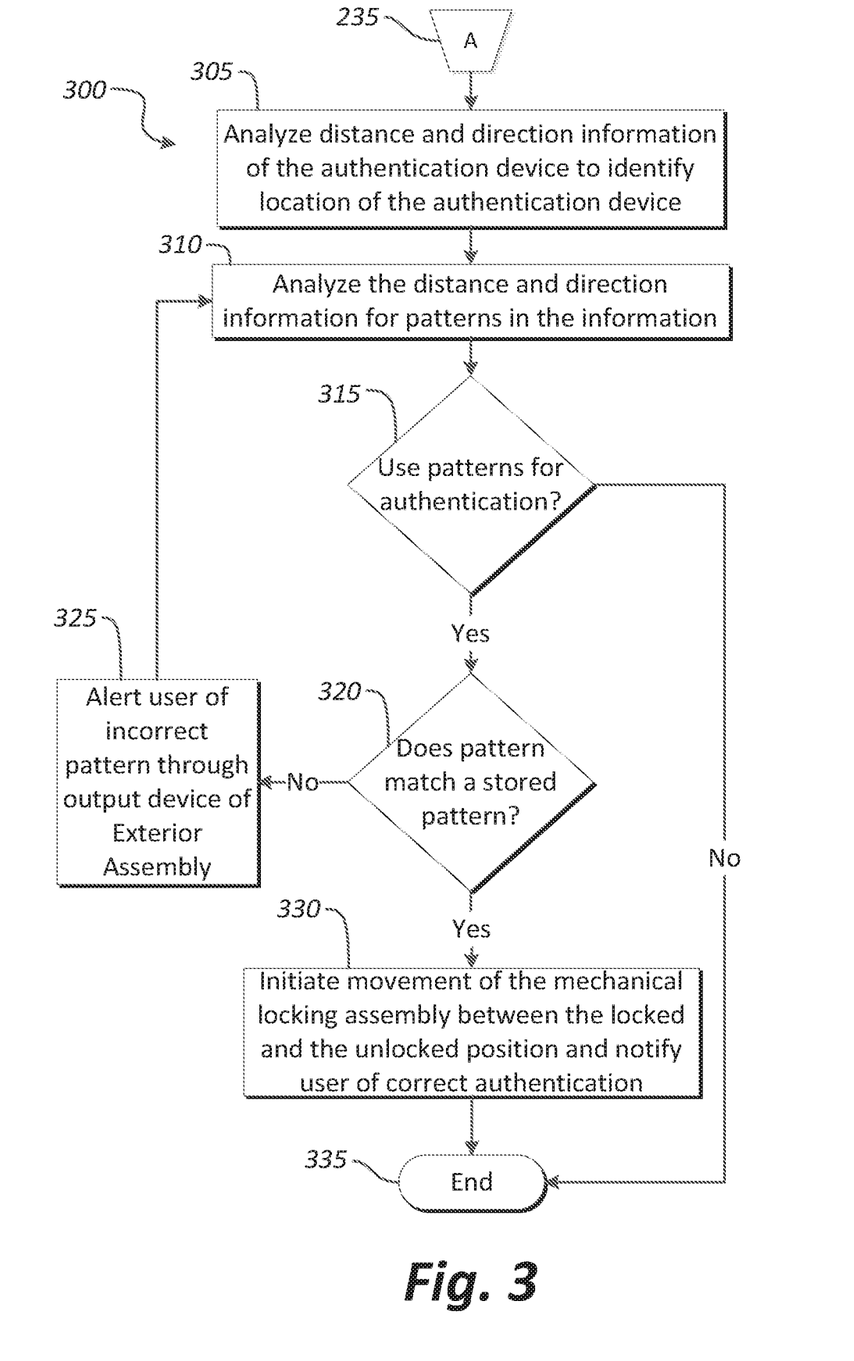
FIG. 3 is a continuation of the simplified flowchart in FIG. 2 showing the example operation of the example lockset system interacting with the authentication device utilizing the angle of arrival sensor according to an embodiment of the disclosure.

FIG. 3 is a simplified flow chart showing an example operation of the lockset system 100 using the information provided by the AoA sensor 104. In the example shown, a method of operation 300 begins with the operation 235 from FIG. 2. In another embodiment, the method of operation 300 may begin with distance and direction information stored in memory 114. After operation 235, the process continues to operation 305 where the lockset system 100 analyzes the distance and direction information of the authentication device 128 that emitted the analyzed signal to identify a location of the authentication device 128. After operation 305, the process continues to operation 310 where the lockset system 100 analyzes the distance and direction information for patterns in the information. In another embodiment, the lockset system 100 may analyze the location information determined in operation 305 instead of the distance and direction information for patterns in the information. After operation 310, the process continues to operation 315 where the lockset system 100 determines if the pattern is used for authentication. Operation 315 may determine if there is an attempt to replicate a pattern stored in memory 114. In addition, operation 315 may be the start for a method of operation shown in FIG. 4. If the lockset system 100 determines the patterns are not for authentication, then the process continues to operation 335 where the method of operation 300 ends. If the lockset system 100 determines that the patterns are used for authentication, then the process continues to operation 320.

In operation 320, the lockset system 100 determines if the pattern presented by the authentication device 128 matches a pattern stored in memory 114. If the pattern presented by the authentication device 128 does not match a pattern stored in memory 114, then the process continues to operation 325 where the lockset system 100 alerts a user of the authentication device 128 through the output device 120 of the exterior assembly 116. In another embodiment, the lockset system 100 may send a push notification of a failed attempt to the authentication device 128 as described above. After operation 325, the process returns to operation 310 to analyze the distance and direction information again for patterns in the information. The return to operation 310 allows for another attempt to use a pattern for authentication. If the pattern presented by the authentication device 128 does match a pattern stored in memory 114, then the process continues to operation 330 where the controller 106 may send a signal to the motor 122 to control movement of the bolt of the latch assembly 124 between the locked position and the unlocked position. In operation 330, the lockset system 100 may also notify the user of correct authentication as described above. Operation 330 may be used to lock the lockset system 100 or unlock the lockset system 100 in response to a matched stored pattern in memory 114 as described above. After operation 330, the process continues to operation 335 where the method of operation 300 ends.

Figure 4:
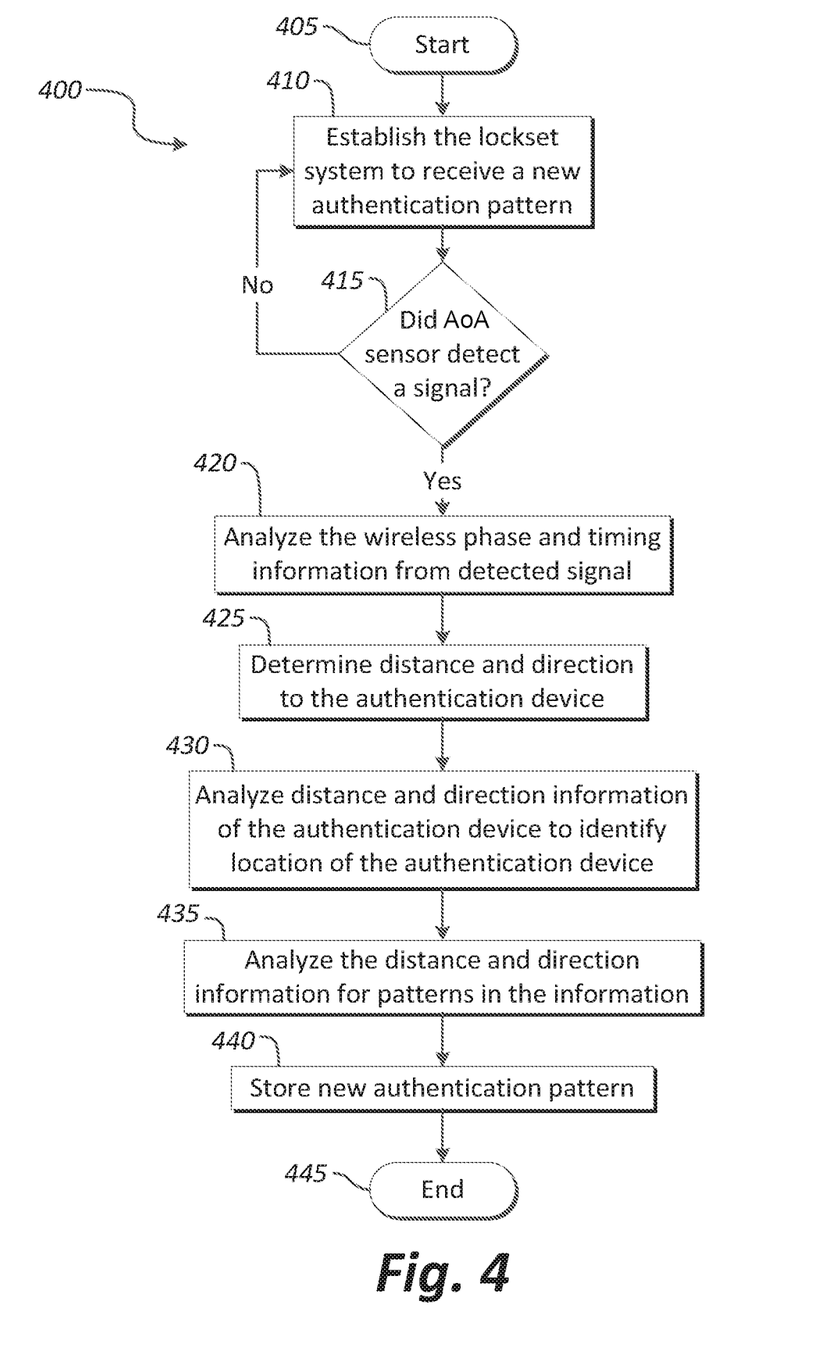
FIG. 4 is a simplified flowchart showing an example operation of the example lockset system detecting and storing a new authentication pattern for the authentication device according to an embodiment of the disclosure.

FIG. 4 is a simplified flow chart showing an example operation of the lockset system 100 using the AoA sensor 104. In the example shown, the method of operation 400 begins with operation 405 where the user begins the operation 400. After operation 405, the process continues to operation 410 where the user establishes the lockset system 100 to receive a new authentication pattern. In one embodiment, an authentication device 128 may initiate the process of setting the lockset system 100 to receive a new authentication pattern. In another embodiment, the lockset system 100 may be configured to receive a new authentication pattern.

For example, the lockset system 100 may include a button to be pressed to configure the lockset system 100 to receive a new authentication pattern. After operation 410, the process continues to operation 415 where the AoA sensor 104 checks to see if there is an incoming wireless signal emitted from an authentication device 128. If the AoA sensor 104 does not detect the signal, then the process returns to operation 410. If the AoA sensor 104 does detect the signal, then the process continues to operation 420 where the lockset system 100 analyzes a wireless phase and timing information from the detected signal. After operation 420, the process continues to operation 425 where the lockset system 100 determines distance and direction to the authentication device 128 that emitted the detected signal. After operation 425, the process continues to operation 430 where the lockset system 100 analyzes the distance and direction information of the authentication device 128 that emitted the analyzed signal to identify a location of the authentication device 128. After operation 430, the process continues to operation 435 where the lockset system 100 analyzes the distance and direction information for patterns in the information. In another embodiment, the lockset system 100 may analyze the location information determined in operation 430 instead of the distance and direction information for patterns in the information. After operation 435, the process continues to operation 440 where the lockset system 100 stores the new authentication pattern. After operation 440, the process continues to operation 445 where the method of operation 400 ends.

EXAMPLES

Illustrative examples of the lockset disclosed herein are provided below. An embodiment of the lockset may include any one or more, and any combination of, the examples described below.

Example 1 is a lockset that includes a latch assembly including a bolt movable between an extended position and a retracted position. The lockset includes a motor configured to move the bolt between the extended position and the retracted position. The lockset includes a controller configured to electronically control the motor to control movement of the bolt between the extended position and the retracted position responsive to receiving a valid authentication from an authentication device. The lockset includes a receiver connected to an antenna to detect an incoming wireless signal transmitted from an authentication device. The controller is further configured to determine the distance and direction to the authentication device transmitting the incoming wireless signal by analyzing the wireless phase and timing of the incoming wireless signal.

In Example 2, the subject matter of Example 1 is further configured such that the controller provides a wakeup signal for the lockset to turn on one or more components of the lockset that are in a sleep state responsive to initial detection of the incoming wireless signal.

In Example 3, the subject matter of Example 1 is further configured such that the controller is further configured to analyze the distance and direction information to identify a location of the authentication device.

In Example 4, the subject matter of Example 3 is further configured such that the controller is further configured to use GPS data received from the authentication device to identify the location of the authentication device.

In Example 5, the subject matter of Example 1 is further configured such that the controller is further configured to analyze the distance and direction information using an algorithm to detect patterns in the information.

In Example 6, the subject matter of Example 5 is further configured such that the controller is further configured to store the detected patterns in a memory for use as an authentication factor.

In Example 7, the subject matter of Example 6 is further configured such that, in response to the controller detecting a pattern stored in memory, the controller sends a signal to the motor to control movement of the bolt between the extended position and the retracted position.

In Example 8, the subject matter of Example 7 is further configured such that, in response to the controller detecting the pattern stored in memory and receiving a valid authentication code from an input device, the controller sends a signal to the motor to control movement of the bolt between the extended position and the retracted position.

In Example 9, the subject matter of Example 6 is further configured such that in response to the controller detecting an incorrect pattern in an attempt to perform a pattern stored in memory, the controller will send a signal to an output device to alert the user of an incorrect pattern.

In Example 10, the subject matter of Example 1 is further configured such that the controller is further configured to analyze the distance and direction information to determine if the authentication device is one or more of approaching or getting farther away from the lockset.

In Example 11, the subject matter of Example 10 is further configured such that, in response to a determination the authentication device is approaching the lockset, the controller sends a signal to the motor to control movement of the bolt between the extended position and the retracted position.

In Example 12, the subject matter of Example 10 is further configured such that, in response to a determination the authentication device is getting farther from the lockset, the controller sends a signal to the motor to control movement of the bolt between the extended position and the retracted position.

In Example 13, the subject matter of Example 1 is further configured such that the controller is configured to trigger an authentication of the authentication device to verify if the authentication device is a valid authentication device from a list of valid authentication devices stored in a memory responsive to detection by the receiver of the incoming wireless signal.

Example 14 provides a method of detecting an authentication device for use with an electronic lockset. The method includes monitoring for an incoming wireless signal emitted from an authentication device. The method includes detecting, with a receiver and an antenna, the incoming wireless signal. The method includes analyzing, with a controller, wireless phase and timing information from the incoming wireless signal. The method includes determining, with the controller, distance and direction to the authentication device through the analysis of the wireless phase and timing information.

In Example 15, the subject matter of Example 14 is further configured to provide a wakeup signal for the lockset to turn on one or more components of an electronic lockset that are in a sleep state responsive to initial detection of the incoming wireless signal.

In Example 16, the subject matter of Example 14 is further configured by analyzing the distance and direction information with the controller to identify the location of the authentication device.

In Example 17, the subject matter of Example 16 is further configured such that the controller is further configured to use GPS data received from the authentication device to identify the location of the authentication device.

In Example 18, the subject matter of Example 14 is further configured by analyzing the distance and direction information to detect patterns in the information.

In Example 19, the subject matter of Example 18 is further configured by storing the detected patterns in a memory.

In Example 20, the subject matter of Example 19 is further configured such that, in response to detecting a pattern stored in memory, the controller sends a signal to the motor to control movement of the bolt between the extended position and the retracted position.

In Example 21, the subject matter of Example 20 is further configured such that, in response to the controller detecting the pattern stored in memory and receiving a valid authentication code from an input device, the controller sends a signal to the motor to control movement of the bolt between the extended position and the retracted position.

In Example 22, the subject matter of Example 19 is further configured such that, in response to detecting, with the controller, an incorrect pattern in an attempt to perform a pattern stored in memory, the controller will send a signal to an output device to alert the user of an incorrect pattern.

In Example 23, the subject matter of Example 14 is further configured by analyzing the distance and direction information to determine if the authentication device is approaching or getting farther from the lockset.

In Example 24, the subject matter of Example 23 is further configured such that, in response to a determination by the controller that the authentication device is approaching the lockset, the controller sends a signal to the motor to control movement of the bolt between the extended position and the retracted position.

In Example 25, the subject matter of Example 23 is further configured such that, in response to a determination by the controller that the authentication device is getting farther from the lockset, the controller sends a signal to the motor to control movement of the bolt between the extended position and the retracted position.

In Example 26, the subject matter of Example 14 is further configured by verifying, by the controller, if the authentication device is a valid authentication device from a list of valid authentication devices stored in a memory in response to detecting the incoming wireless signal.

What is claimed is:

1. A lockset comprising:
   a latch assembly including a bolt movable between an extended position and a retracted position;
   a motor configured to move the bolt between the extended position and the retracted position;
   an interior assembly and an exterior assembly;
   an antenna located in only one of the exterior assembly or interior assembly;
   a controller configured to electronically control the motor to control movement of the bolt between the extended position and the retracted position responsive to receiving a valid authentication from an authentication device;
   a receiver connected to the antenna to detect an incoming wireless signal transmitted from the authentication device;
   wherein the controller includes an angle of arrival sensor configured to analyze a wireless phase and timing of the incoming wireless signal transmitted by the authentication device to obtain distance and direction information representing a distance and direction to the authentication device;
   wherein the controller is configured to:
     detect a pattern of movement of the authentication device based, at least in part, on the distance and direction information; and
     control movement of the bolt between the extended and retracted positions based, at least in part, on the detected pattern of movement of the authentication device.

2. The lockset of claim 1, wherein the controller is further configured to use global positioning system (GPS) data received from the authentication device to identify a location of the authentication device.

3. The lockset of claim 1, wherein the controller detects the pattern of movement of the authentication device using an algorithm to detect patterns in the distance and direction information.

4. The lockset of claim 1, wherein, in response to the controller detecting the pattern of movement of the authentication device, the controller sends a signal to the motor to control movement of the bolt between the extended position and the retracted position.

5. The lockset of claim 1, wherein, in response to the controller detecting the pattern of movement of the authentication device and receiving a valid authentication code, the controller sends a signal to the motor to control movement of the bolt between the extended position and the retracted position.

6. The lockset of claim 1, wherein the controller is further configured to analyze the distance and direction information to determine if the authentication device is moving towards or away from the lockset.

7. The lockset of claim 6, wherein, in response to a determination the authentication device is moving towards the lockset, the controller sends a signal to the motor to control movement of the bolt between the extended position and the retracted position.

8. The lockset of claim 6, wherein the antenna is located only in the interior assembly.

9. The lockset of claim 1, wherein the incoming wireless signal transmitted by the authentication device initiates wakeup of one or more components of the lockset.

10. The lockset of claim 1, wherein the detected pattern of movement is a geometric pattern.

11. A method of detecting an authentication device for use with an electronic lockset, the method comprising:
   monitoring, by a controller of the electronic lockset, for an incoming wireless signal emitted from the authentication device, the electronic lockset including an interior assembly and an exterior assembly and only one of the exterior assembly or interior assembly includes an antenna;
   detecting, with a receiver and the antenna, the incoming wireless signal;
   analyzing, by the controller, wireless phase and timing information from the incoming wireless signal;
   determining, by the controller, distance and direction information representing a distance and direction to the authentication device through the analysis of the wireless phase and timing information;
   analyzing the distance and direction information to detect a pattern of movement of the authentication device; and
   controlling, via the controller, movement of a bolt between a locked position and an unlocked position positions based, at least in part, on the detected pattern of movement of the authentication device.

12. The method of claim 11, wherein the controller is further configured to use global positioning system (GPS) data received from the authentication device to identify a location of the authentication device.

13. The method of claim 11, wherein the controller detects the pattern of movement of the authentication device using an algorithm to detect patterns in the distance and direction information.

14. The method of claim 11, wherein, in response to detecting the pattern of movement of the authentication device, the controller controls movement of the bolt between the locked position and the unlocked position.

15. The method of claim 11, wherein, in response to the controller detecting the pattern of movement of the authentication device and receiving a valid authentication code, the controller sends a signal to control movement of the bolt between the locked position and the unlocked position.

16. The method of claim 11, further comprising analyzing the distance and direction information to determine if the authentication device is moving towards or away from the electronic lockset.

17. The method of claim 16, wherein, in response to a determination by the controller that the authentication device is moving towards the electronic lockset, the controller sends a signal to control movement of the bolt between the locked position and the unlocked position.

18. The method of claim 16, wherein, in response to a determination by the controller that the authentication device is moving away from the electronic lockset, the controller sends a signal to control movement of the bolt between the locked position and the unlocked position.

19. The method of claim 11, wherein the antenna is located only in the interior assembly.

20. A lockset comprising:
a latch assembly including a bolt movable between an extended position and a retracted position;
a motor configured to move the bolt between the extended position and the retracted position;
an interior assembly and an exterior assembly, wherein only the interior assembly includes an antenna;
a controller configured to electronically control the motor to control movement of the bolt between the extended position and the retracted position responsive to receiving a valid authentication from an authentication device;
a receiver connected to the antenna to detect an incoming wireless signal transmitted from the authentication device;
wherein the controller includes an angle of arrival sensor configured to determine a distance and a direction to the authentication device by analyzing a wireless phase and timing of the incoming wireless signal transmitted by the authentication device; and
wherein the controller is configured to control movement of the bolt between the extended and retracted positions based, at least in part, on detecting a pattern of movement of the authentication device determined by analyzing the distance and the direction to the authentication device.

21. The lockset of claim 20, wherein the controller is further configured to determine if the authentication device is moving towards or away from the lockset.

22. The lockset of claim 20, wherein the controller is configured to use an algorithm to detect patterns in the distance and direction information, wherein the detected patterns reflect the pattern of movement of the authentication device.

* * * * *